(12) United States Patent
Taylor et al.

(10) Patent No.: US 9,916,112 B1
(45) Date of Patent: Mar. 13, 2018

(54) EFFICIENT FILE COPY THAT AVOIDS DATA DUPLICATION

(71) Applicant: EMC Corporation, Hopkinton, MA (US)

(72) Inventors: Alan L. Taylor, Cary, NC (US); Karl M. Owen, Chapel Hill, NC (US); Samuel Mullis, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 143 days.

(21) Appl. No.: 14/041,820

(22) Filed: Sep. 30, 2013

(51) Int. Cl.
G06F 12/16 (2006.01)
G06F 3/06 (2006.01)

(52) U.S. Cl.
CPC ............ G06F 3/065 (2013.01); G06F 3/0614 (2013.01); G06F 3/0683 (2013.01)

(58) Field of Classification Search
CPC ....... G06F 3/065; G06F 3/0683; G06F 3/0689
USPC .................................................. 711/114, 162
See application file for complete search history.

(56) References Cited

U.S. PATENT DOCUMENTS

| | | | |
|---|---|---|---|
| 6,226,759 B1 * | 5/2001 | Miller ................. | G06F 11/1466 707/999.202 |
| 6,772,302 B1 * | 8/2004 | Thompson ............ | G06F 3/0617 707/999.202 |
| 7,082,445 B2 | 7/2006 | Beal | |
| 7,146,474 B2 | 12/2006 | Nguyen et al. | |
| 7,506,116 B2 | 3/2009 | Haselton et al. | |
| 8,099,571 B1 * | 1/2012 | Driscoll .............. | G06F 11/2066 707/655 |
| 8,190,850 B1 | 5/2012 | Davenport et al. | |
| 8,290,911 B1 | 10/2012 | Janakiraman et al. | |
| 2010/0211616 A1 * | 8/2010 | Khandelwal ........ | G06F 12/0868 707/812 |
| 2011/0016095 A1 * | 1/2011 | Anglin ................ | G06F 11/1453 707/692 |
| 2012/0233429 A1 | 9/2012 | Benhase et al. | |
| 2012/0317383 A1 | 12/2012 | Lyaskovsky et al. | |

\* cited by examiner

*Primary Examiner* — Ann J Lo
*Assistant Examiner* — Tracy A Warren
(74) *Attorney, Agent, or Firm* — BainwoodHuang

(57) ABSTRACT

A copy technique involves generating, upon receiving a command to copy at least a portion of a source file, a set of pointers for a destination file that point to a set of pointers for the source file ("physical block pointers"), which in turn point to physical blocks storing data of the file in a storage system. In response to the copy command, a storage processor allocates an inode from an inode table of a file system for the destination file and stores a set of inode pointers in the inode of the destination file that point to the set of pointers for the source file. Thus, instead of creating a redundant copy of the data of the source file, the improved creates technique creates pointers that point to the data stored for the source file.

13 Claims, 4 Drawing Sheets

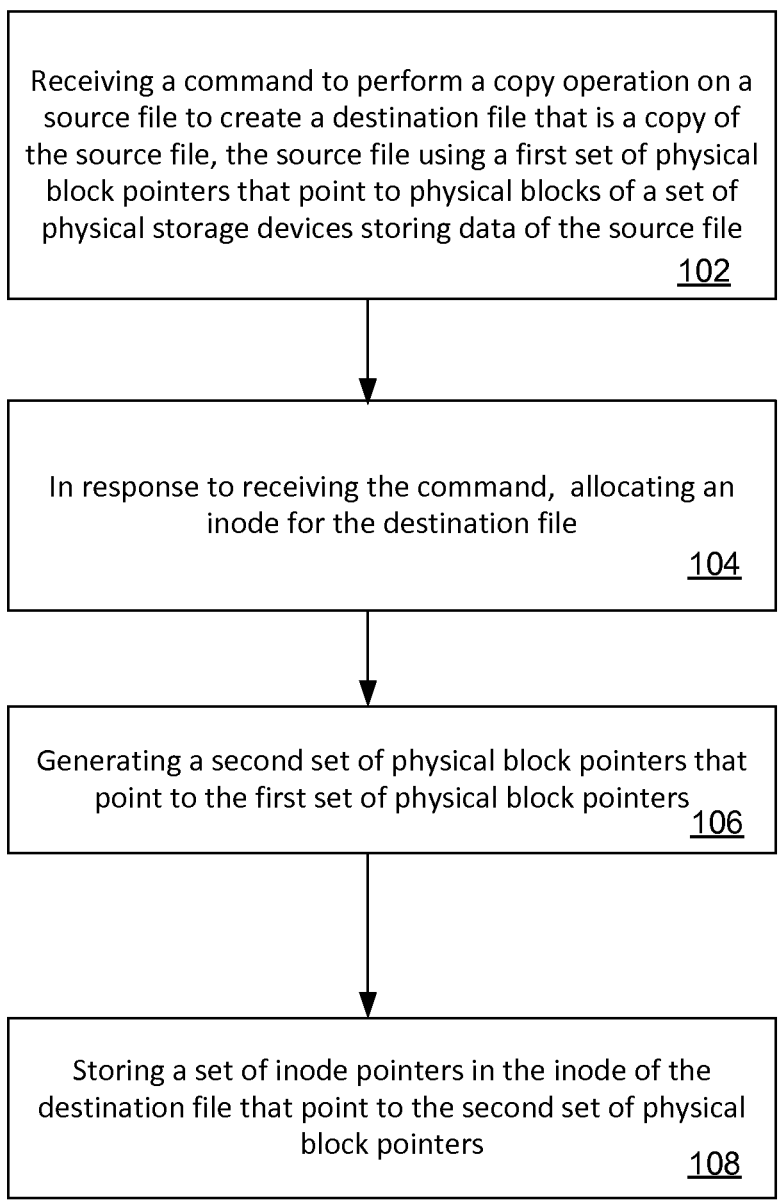

EFFICIENT FILE COPY THAT AVOIDS DATA DUPLICATION

BACKGROUND

Various techniques are available for carrying out copy operations on files in file systems. One conventional copy technique copies files from one storage disk to another when the disks are connected via a high-speed connection. One copy technique directs a processor to read a page of memory into cache. The technique then adjusts the cached page to simulate a write operation. Another copy technique aims to reduce memory copies by dealing with the write cache directly. Still another copy technique performs a simple copy where data from a source file are read into a buffer in memory and written out to a destination file.

In some arrangements, storage systems permit deduplication operations. A deduplication operation frees up storage space by using pointers for duplicate copies of a file that point to data stored for an original copy and then deleting the redundant data stored for the duplicate copies.

SUMMARY

Unfortunately, there are deficiencies with the above-described conventional copy techniques. For example, independent of the particular copy technique applied, a storage system must allocate a significant amount of storage space to accommodate copied files. Along these lines, suppose, for example, that the source file is a virtual machine file, such as one created via virtualization software from VMware, Inc. of Palo Alto, Calif. Virtual machine files can normally attain sizes of 100 GB, so to create 100 virtual machine instances would require a total storage allocation of 10 TB. Thus, it is necessary to provision LUNs (logical storage units) of very large sizes to accommodate the large number of large files. Although deduplication can be run to reduce redundant storage, deduplication is run after the files are created, and thus does not change the fact that large amounts of storage space must be provisioned up front for copy operations to succeed. Thus, conventional copy techniques can place a high burden on storage systems to provision large amounts of storage, even if such large amounts of storage are only needed transiently.

In contrast with the above-described conventional copy techniques, which can require provisioning of large amounts of storage space that are only transiently needed, improved copy techniques involve generating, upon receiving a command to copy at least a portion of a source file, a set of pointers for a destination file that point to a set of pointers for the source file ("physical block pointers"), which in turn point to physical blocks storing data of the file in a storage system. In response to the copy command, a storage processor accesses an inode from an inode table of a file system for the destination file and stores a set of inode pointers in the inode of the destination file that point to the set of pointers for the source file. Thus, instead of creating a redundant copy of the data of the source file, the improved creates pointers that point to the data stored for the source file.

Advantageously, the improved copy techniques avoid allocating large amounts storage space for copying because the data of the source file is not copied. Thus, the storage space that needs to be allocated may be substantially less than that required by conventional copy techniques.

One embodiment of the improved technique is directed to a method of copying data stored in files. The method includes receiving a command to perform a copy operation on a set of physical blocks of a set of physical storage devices that store data of a source file to create at least a portion of a destination file, the source file using a first set of physical block pointers that point to physical blocks of a set of physical storage devices storing data of the source file. The method also includes, in response to receiving the command, (i) accessing an inode for the destination file, (ii) generating a second set of physical block pointers that point to the first set of physical block pointers, and (iii) storing a set of inode pointers in the inode of the destination file that point to the second set of physical block pointers.

Additionally, some embodiments of the improved technique are directed to an apparatus constructed and arranged to copy data stored in files. The apparatus includes memory and a set of processors coupled to the memory to form controlling circuitry. The controlling circuitry is constructed and arranged to carry out the method of copying data stored in files.

Furthermore, some embodiments of the improved technique are directed to a computer program product having a non-transitory computer readable storage medium which stores code including a set of instructions which, when executed by a computer, cause the computer to carry out the method of copying data stored in source files.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 4 is a flow chart illustrating an example method of carrying out the improved technique within the storage systems shown in FIG. 1 and/or FIG. 3.

DETAILED DESCRIPTION

Improved copy techniques involve generating, upon receiving a command to copy at least a portion of a source file, a set of pointers for a destination file that point to a set of pointers for the source file ("physical block pointers"), which in turn point to physical blocks storing data of the file in a storage system. In response to the copy command, a storage processor accesses an inode from an inode table of a file system for the destination file and stores a set of inode pointers in the inode of the destination file that point to the set of pointers for the source file. Thus, instead of creating a redundant copy of the data of the source file, the improved creates technique creates pointers that point to the data stored for the source file.

Figure 1:
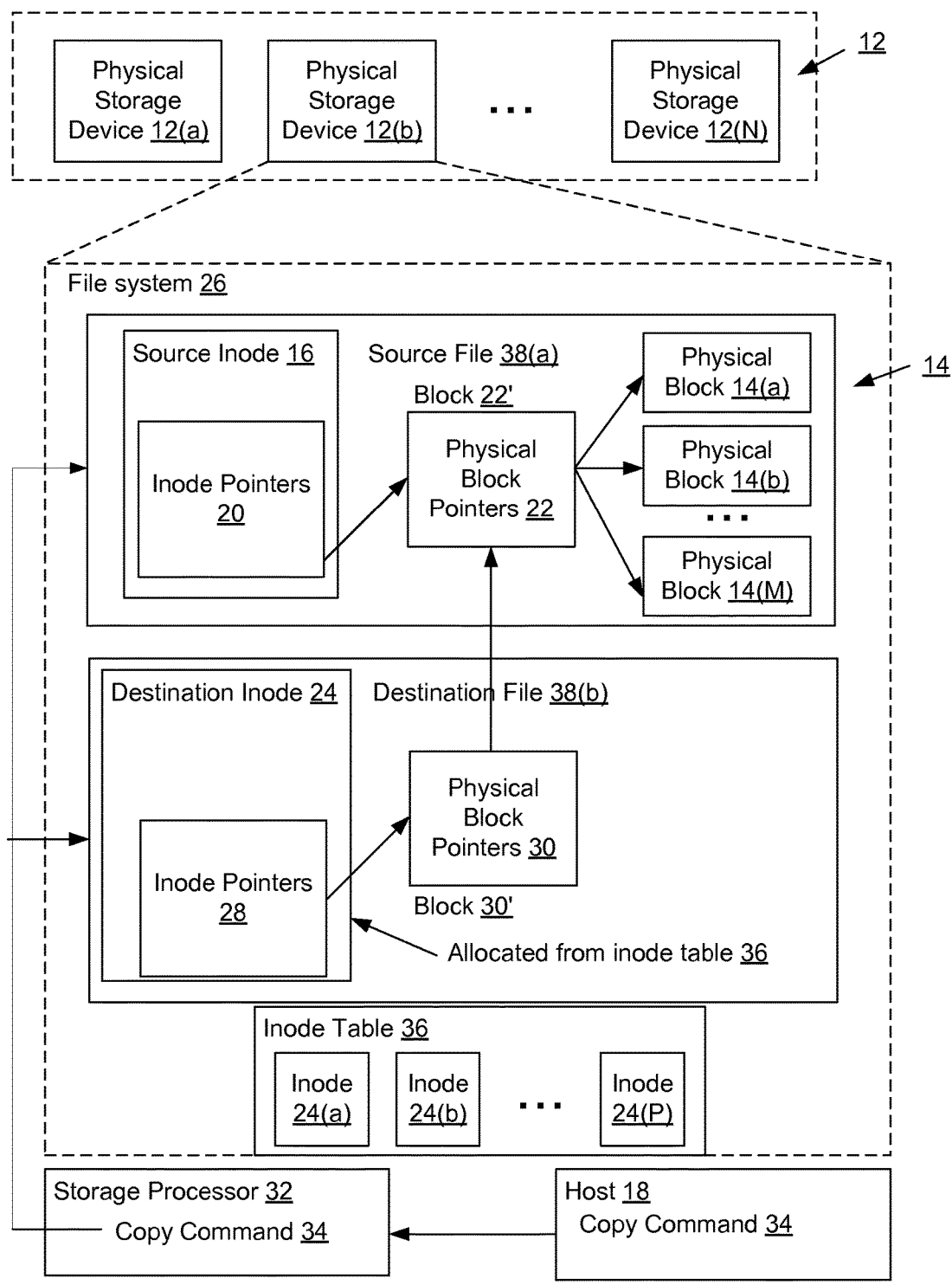
FIG. 1 is a block diagram illustrating an example storage system in which the improved technique can be carried out.

Advantageously, the improved copy techniques avoid allocating large amounts storage space for copying because duplicate copies of file data are not made. Thus, the storage space that needs to be allocated may be substantially less than that required by conventional copy techniques. FIG. 1 illustrates an example storage system 10 in which the improved technique may be carried out. Storage system 10 includes physical storage devices 12(*a*), 12(*b*), . . . , 12(N), where N is the number of physical storage devices in storage system 10. Storage system 10 also includes storage processor 32 and host 18.

Host 18 is constructed and arranged to issue copy command 34 in response to, e.g., manual input from a user, or as part of an automated process. Host computer may be a server, but can also be a desktop computer, a laptop computer, a tablet computer, smartphone, or the like.

Storage processor 34 is a computerized apparatus constructed and arranged to control storage operations for physical storage devices 12(*a*), 12(*b*), . . . , 12(N). In particular, storage processor 32 constructed and arranged to receive copy command 34 from host 18, and to execute copy command 34 in response to the copy command 34.

Physical storage devices 12(*a*), 12(*b*), . . . , 12(N) (physical storage devices 12) are each constructed and arranged to store data of source file 38(*a*) in physical blocks 14(*a*), 14(*b*), . . . , 14(M) (physical blocks 14) within file system 26, where M is the number of physical blocks storing data for source file 38(*a*). Physical storage devices 12 are connected to storage processor 32 either locally or over a remote connection. Physical storage devices 12 may take the form of magnetic disks arranged in a RAID array, although in some arrangements, physical storage devices 12 may take the form of individual magnetic disks, solid-state storage, or a combination of the two.

It should be understood that, while file system 26 is illustrated in FIG. 1 as coming from storage device 12(*b*), in reality file system 26 comes from a LUN formed from multiple storage devices 12.

Source file 38(*a*) stores data on disk in, say, physical storage device 12(*b*). Physical storage device 12(*b*) stores the data, as discussed above, in physical blocks 14. Source file 38(*a*) further is provided in connection with a source inode 16 and physical block pointers 22. Source file 38(*a*) is stored within file system 26.

Source inode 16 includes inode pointers 20. Mode pointers 20 point, either directly or indirectly, to physical block pointers 22, which point, either directly or indirectly, to physical blocks 14 storing data and of the source file 38(*a*).

In an example, each block stored within physical storage devices 12, whether a block of pointers, data, or metadata, is of a fixed size. In the example presented herein, each block is 8 kilobytes (kB) in size. In other arrangements, the blocks may be other sizes such as 2 kB, 4 kB, 16 kB, and so on.

As illustrated in FIG. 1, a block 22' of physical block pointers 22 is pointed to by pointer 20 in source inode 16, and the physical block pointers 22 point, directly or indirectly, to physical blocks 14. In some cases, physical block pointers 22 point directly to physical blocks 14. In other cases, physical block pointers 22 point to other physical block pointers, which, in turn, point to physical blocks 14. Some physical block pointers may point to physical blocks that store data shared with another file. Such an arrangement is common in block-sharing environments such as in file systems that support deduplication. An example of a block-sharing environment is described in U.S. Pat. No. 8,190,850.

During operation, storage processor 32 receives copy command 34 from host 18, e.g., in response to a user manually entering a command from a command line interface. In response to copy command 34, storage processor 32 creates destination file 38(*b*) by accessing destination inode 24 (i.e., one of inodes 24(*a*), 24(*b*), . . . , inode 24(P), where P is the number of inodes in inode table 36) from inode table 36 in file system 26.

It should be understood that, in some arrangements, the source file and the destination may be the same file.

Destination inode 24, like source inode 16, contains inode pointers 28 that point to physical block pointers 30, which may be stored in one or more blocks 30'. Block 30', as will be discussed below, contains pointers that point to pointers contained in indirect blocks 22' containing physical block pointers 22 of source file 38(*a*).

Storage processor 32 also determines the location of each block 22' of physical block pointers 22 referenced by source inode 16. In the example illustrated in FIG. 1, storage processor 32 finds the locations of blocks such as block 22' of physical block pointers 22 that point directly to physical blocks 14.

Storage processor 32 then writes the pointers 22 of indirect block 22' in a block 30' of physical block pointers for destination file 38(*b*). When the first address has been written, storage processor 32 writes the address of block 30' into destination inode 24 as a pointer 28 to a physical block pointer 30. When block 30' has been filled with addresses, storage processor 32 allocates a new block, writes the address of the new block in inode 24, and writes the address of remaining physical block pointers in that block. The process repeats until storage processor 32 has read all of the indirect block addresses for source file 38(*a*).

It should be understood that this above-described copy technique may not be able to be performed in all circumstances. For example, the above copy technique can only be performed in a file systems that employs physical block pointers. In an example, such file systems also support deduplication. Within a file system that supports deduplication, storage processor 32 may employ block-sharing primitives in order to locate the blocks containing pointers that directly point to physical blocks 14. For example, such block-sharing primitives may be used in taking a snapshot of the file system.

Not all files, however, are stored within file systems that support deduplication. In such a case, storage processor 32 finds another copy technique by which to carry out copy command. For example, if storage processor 32 cannot carry out the above-described copy technique, then storage processor may attempt a (data movement) DM IOCTL operation in which storage processor 32 cache reads a page of memory and then adjusts the cached page to simulate a write operation. In some arrangements, there is a sequence of copy techniques that storage processor 32 may attempt, including, as a last resort, a standard buffered read/write.

Figure 2:
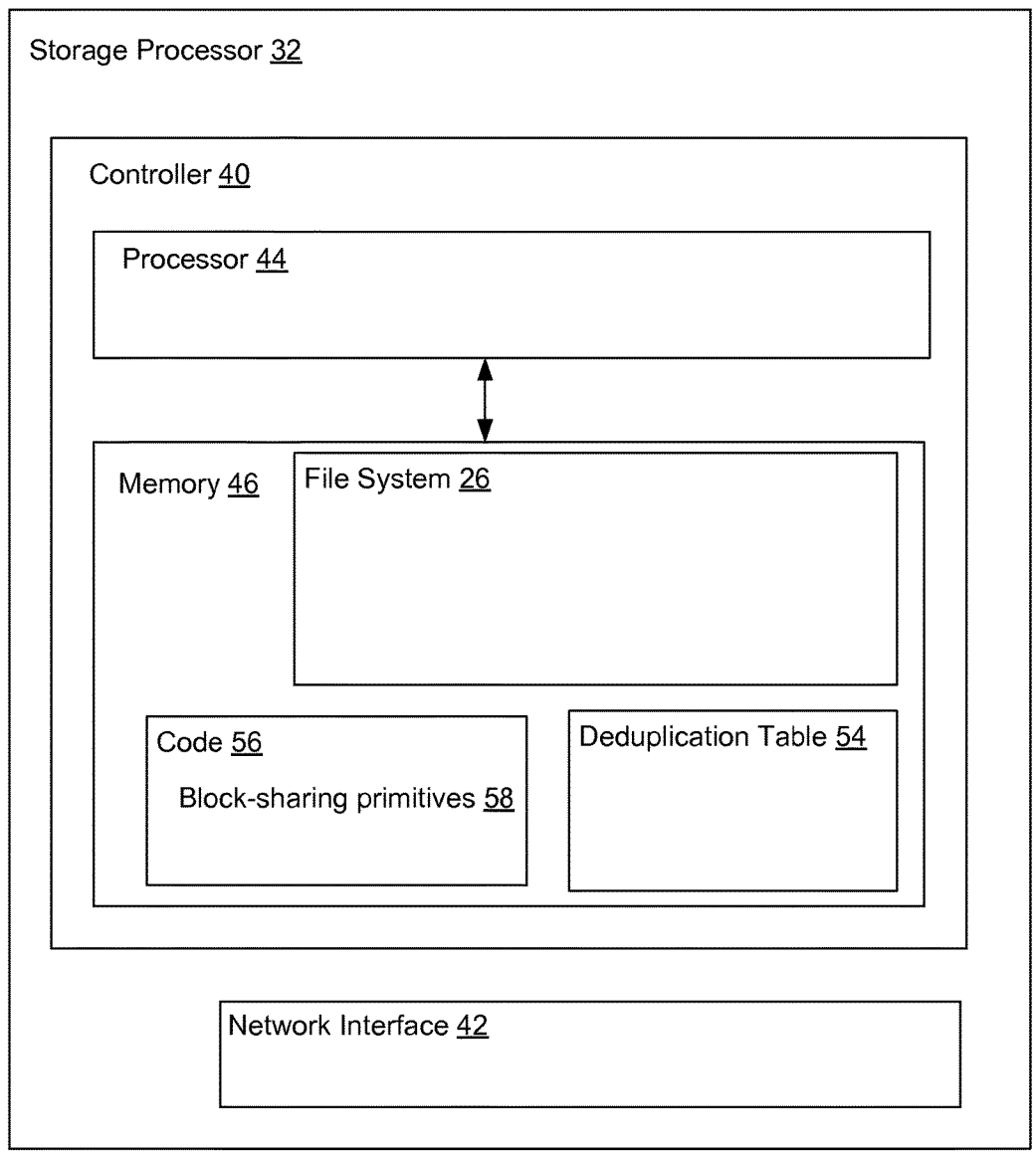
FIG. 2 is a block diagram illustrating an example storage processor within the storage system shown in FIG. 1.

FIG. 2 illustrates further detail concerning storage processor 32. Storage processor 32 includes controller 40, which in turn includes processor 44 and memory 46. Storage processor 32 also includes network interface 42, e.g., Ethernet, Token Ring, Fibre Channel, or iSCSI, for communicating with hosts, and an array interface (e.g., Fibre Channel or iSCSI), for communicating with storage devices 12.

Processor 44 takes the form of one or more processing chips and/or assemblies. Processor 44 is coupled to memory 46 and is configured to execute instructions from code 56.

Memory 46 is configured to store code 58 containing instructions that, when executed by the processor 44, causes storage processor 44 to carry out the method of copying a source file. Code 56 includes block-sharing primitives used in locating blocks of pointers to physical blocks 14. Memory 46 is also configured to store file system 26 and, in some arrangements, deduplication table 54, which contains identifiers of files, such as hashes of file contents. Memory 46 includes both volatile and non-volatile memory such as random access memory, magnetic disk drives, and/or flash memory, for example.

Figure 3:
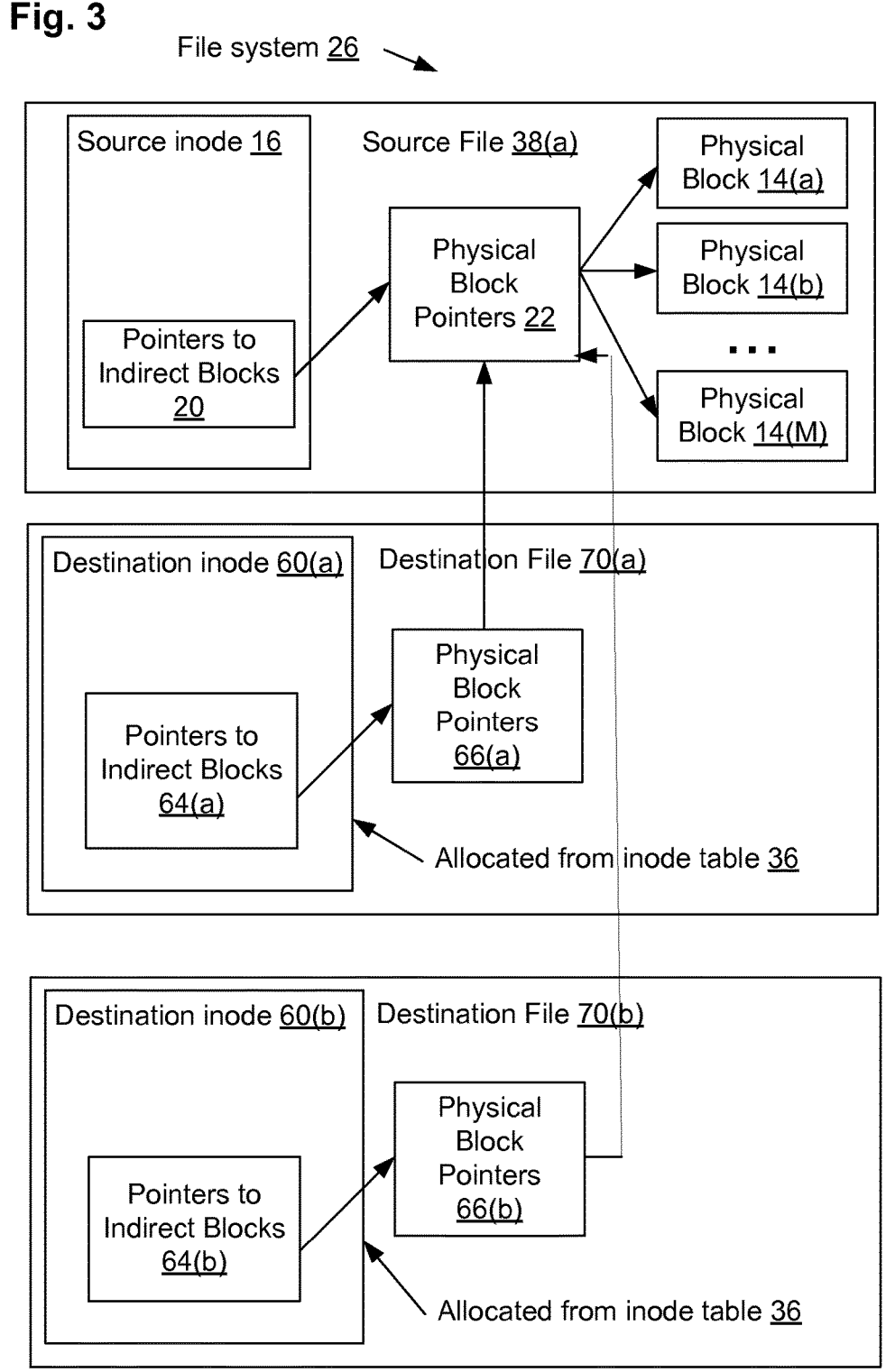
FIG. 3 is a block diagram illustrating another view of the example storage system in which the improved technique may be carried out.

FIG. 3 illustrates file system 26 in another example situation. In this example, processor 32 receives a command from host 18 (see FIG. 1) to make two copies of source file 38(a). In response to the command, storage processor 32 creates destination files 70(a) and 70(b). In creating these destination files, storage processor accesses two destination inodes 60(a) and 60(b), respectively. Each of these inodes, as previously discussed, has inode pointers 64(a) and 64(b) to indirect blocks, although pointers to direct blocks may be generated as needed at a later time.

Storage processor 32 ensures that each destination file 70 contains a precise copy of source file 38(a). Along these lines, physical block pointers 66(a) and 66(b) point to the physical block pointers 22 of the source file 38(a). That is, rather than allow a succession of physical block pointers, i.e., physical block pointers in block 66(b) pointing to physical block pointers in block 66(a), each of the pointers point to blocks of source file 38(a).

FIG. 4 illustrates a method 100 of copying source files, including steps 102, 104, 106, and 108. In step 102, a command to perform a copy operation, e.g., copy operation 34, on a source file, e.g., source file 38(a), to create a destination file, e.g., source file 38(b), that is a copy of the source file, the source file using a first set of physical block pointers, e.g., physical block pointers 22, that point to physical blocks, e.g., physical blocks 14, of a set of physical storage devices, e.g., physical storage devices 12, storing data of the source file. In step 104, an inode, e.g., destination inode 24, is allocated for the destination file in response to receiving the command. In step 106, a second set of physical block pointers, e.g., physical block pointers 30, that point to the first set of physical block pointers is generated. In step 108, a set of inode pointers, e.g., inode pointers 28, are stored in the inode of the destination file that point to the second set of physical block pointers.

As used throughout this document, the words "comprising," "including," and "having" are intended to set forth certain items, steps, elements, or aspects of something in that these are provided by way of example only and the invention is not limited to these particular embodiments. In addition, the word "set" as used herein indicates one or more of something, unless a statement is made to the contrary.

It should be understood that the improvement described here has a number of applications, including providing a technique for copying a file without requiring significant storage space to be allocated.

It should also be understood that the above-described improved techniques make use of deduplication technology for creating an efficient copy technique. The advantage of the improved techniques, however, lie in the fact that, unlike conventional deduplication, very little provisioning or storage is necessary to carry out the copy technique, even when many copies of large files are needed.

Having described certain embodiments, numerous alternative embodiments or variations can be made. For example, the above discussion dealt mainly with copying files within a disk array. In some arrangements, however, storage processor 32 may copy files locally on, say, solid-state disks or any other configuration not invoking copy offload techniques.

It should also be understood that improved copy techniques may apply to a block array. A storage processor receives commands to copy from one local block address (LBA) extent range to another. The notion of the file, on the other hand, is on a host. A system administrator provisions a LUN on a storage array and exports the LUN to the host. The host then formats the block array with a file system such as NTFS.

It should further be understood that the set of pointers involved in the improved copy techniques may be indirect, or virtual, block mappings that are used in implementing deduplication and other block-sharing operations.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of responding to a copy command in a data storage system, the method comprising:

receiving a copy command to copy at least a portion of a source file in a file system to at least a portion of a destination file, the source file using a first set of physical block pointers that store at least one address that points to a set of physical blocks of a set of physical storage devices that store file data of the source file; and in response to receiving the copy command, performing a copy operation that avoids duplicating any of the file data stored in the set of physical blocks by (i) accessing an inode for the destination file, (ii) generating a second set of physical block pointers that store at least one address that points to the first set of physical block pointers, and (iii) storing a set of inode pointers in the inode of the destination file that point to the second set of physical block pointers, the copy operation establishing the copy without duplicating any of the data stored in the set of physical blocks and thereby conserving storage space, wherein the first set of physical block pointers are stored in physical blocks of the set of physical storage devices, and wherein generating the second set of physical block pointers includes:

reading storage locations of the physical blocks where the first set of physical block pointers are stored, and writing the storage locations in the second set of physical block pointers such that the second set of physical block pointers point to the storage locations where the first set of physical block pointers are stored, wherein the first set of physical block pointers that point to physical blocks of the set of physical storage devices storing data of the source file include (i) a first subset of pointers that point to physical blocks storing data of the source file and (ii) a second subset of pointers that point to the first sub-set of pointers for pointing to physical blocks storing data of the source file, wherein reading the storage locations of the physical blocks where the first set of physical block pointers are stored includes accessing an inode provided for the source file to obtain a set of inode pointers that point to the first set of physical block pointers, and wherein, when writing the storage locations in the second set of physical block pointers, the method includes writing only the locations of the first subset of pointers of the first set of physical block pointers in the second set of physical block pointers.

2. A method as in claim 1, further comprising:

receiving a second command to perform a second copy operation on the source file to create a second destination file that is a copy of the source file;

in response to receiving the second command, (i) accessing an inode for the second destination file, (ii) generating a third set of physical block pointers that point to the first set of physical block pointers, and (iii) storing a set of inode pointers in the inode of the second destination file that point to the third set of physical block pointers.

3. A method as in claim 1, wherein the source file and the destination file are disposed within a single file system in the data storage system, such that the copy operation is between two files in the same file system.

4. A method as in claim 3, wherein the inode of the source file and the inode of the destination file are disposed within a single inode table in the file system.

5. A method as in claim 1, wherein generating the second set of physical block pointers includes providing the second set of physical block pointers in a set of indirect blocks, and wherein the set of inode pointers in the inode of the destination file points to the set of indirect blocks.

6. The method of claim 5, wherein the inode of the source file points to the first set of physical block pointers by pointing to a first set of indirect blocks that contain the first set of physical block pointers, wherein the each of the first set of indirect blocks has a block size, wherein each of the set of physical blocks has a block size, and wherein the block size of each of the first set of indirect blocks equals the block size of each of the set of physical blocks.

7. A method of claim 6, wherein the source file and the destination file are the same file.

8. An electronic apparatus, the electronic apparatus comprising:

a set of processors; and memory coupled to the set of processors, the memory and the set of processors together forming controlling circuitry constructed and arranged to:

receive a copy command to copy at least a portion of a source file to at least a portion of a destination file, the source file using a first set of physical block pointers that store at least one address that points to a set of physical blocks of a set of physical storage devices that store the data of the source file; and in response to receiving the copy command performing a copy operation that avoids duplicating any of the data stored in the set of physical blocks by (i) accessing an inode for the destination file, (ii) generating a second set of physical block pointers that store at least one address that points to the first set of physical block pointers, and (iii) storing a set of inode pointers in the inode of the destination file that point to the second set of physical block pointers, the copy operation establishing the copy without duplicating any of the data stored in the set of physical blocks and thereby conserving storage space, wherein the first set of physical block pointers are stored in physical blocks of the set of physical storage devices, and wherein the controlling circuitry constructed and arranged to generate the second set of physical block pointers is further constructed and arranged to:

read storage locations of the physical blocks where the first set of physical block pointers are stored, and write the storage locations in the second set of physical block pointers such that the second set of physical block pointers point to the storage locations where the first set of physical block pointers are stored, wherein the first set of physical block pointers that point to physical blocks of the set of physical storage devices storing data of the source file include (i) a first subset of pointers that point to physical blocks storing data of the source file and (ii) a second subset of pointers that point to the first sub-set of pointers for pointing to physical blocks storing data of the source file; and wherein the controlling circuitry constructed and arranged to read the storage locations of the physical blocks where the first set of physical block pointers are stored is further constructed and arranged to:

access an inode provided for the source file to obtain a set of inode pointers that point to the first set of physical block pointers, and wherein, when writing the storage locations in the second set of physical block pointers, the controlling circuitry is further constructed and arranged to:

write only the locations of the first subset of pointers of the first set of physical block pointers in the second set of physical block pointers.

9. An apparatus as in claim 8, wherein the controlling circuitry is further constructed and arranged to:

receive a second command to perform a second copy operation on the source file to create a second destination file that is a copy of the source file;

in response to receiving the second command, (i) accessing an inode for the second destination file, (ii) generate a third set of physical block pointers that point to the first set of physical block pointers, and (iii) store a set of inode pointers in the inode of the second destination file that point to the third set of physical block pointers.

10. An apparatus as in claim 8, wherein the controlling circuitry is further constructed and arranged to:

verify, prior to generating the second set of physical block pointers and in response to receiving the command, whether the source file is stored within a file system of the electronic apparatus that is capable of supporting de-duplication.

11. An apparatus as in claim 10, wherein the controlling circuitry is further constructed and arranged to:

perform an alternative copy operation on the set of physical blocks when the source file is not stored within a file system of the electronic apparatus that is capable of supporting de-duplication.

12. A computer program product having a non-transitory, computer-readable storage medium which stores instructions that, when executed by a controller, causes the controller to carry out a method of responding to a copy command in a file system of a data storage system, the method comprising:

receiving a copy command to copy at least a portion of a source file to at least a portion of a destination file, the source file using a first set of physical block pointers to point to a set of physical blocks of a set of physical storage devices that store file data of the source file, the first set of physical block pointers pointing to the set of physical blocks by storing at least one address where the set of physical blocks can be found; and in response to receiving the copy command, performing a copy operation that avoids duplicating any of the file data stored in the set of physical blocks by (i) accessing an inode for the destination file, (ii) generating a second set of physical block pointers that point to the first set of physical block pointers, and (iii) storing a set of inode pointers in the inode of the destination file that point to the second set of physical block pointers, the copy operation establishing the copy without duplicating any of the data stored in the set of physical blocks and thereby conserving storage space, wherein the second set of physical block pointers points to the first set of physical block pointers by storing at least one address where the first set of physical block pointers can be found, and wherein the set of inode pointers points to the second set of physical block pointers by storing at least one address where the second set of physical block pointers can be found, wherein the first set of physical block pointers are stored in physical blocks of the set of physical storage devices, and wherein generating the second set of physical block pointers includes:

reading storage locations of the physical blocks where the first set of physical block pointers are stored, and writing the storage locations in the second set of physical block pointers such that the second set of physical block pointers point to the storage locations where the first set of physical block pointers are stored, wherein the first set of physical block pointers that point to physical blocks of the set of physical storage devices storing data of the source file include (i) a first subset of pointers that point to physical blocks storing data of the source file and (ii) a second subset of pointers that point to the first sub-set of pointers for pointing to physical blocks storing data of the source file, wherein reading the storage locations of the physical blocks where the first set of physical block pointers are stored includes accessing an inode provided for the source file to obtain a set of inode pointers that point to the first set of physical block pointers, and wherein, when writing the storage locations in the second set of physical block pointers, the method includes writing only the locations of the first subset of pointers of the first set of physical block pointers in the second set of physical block pointers.

13. A computer program product as in claim 12, wherein the method further comprises:

receiving a second command to perform a second copy operation on the source file to create a second destination file that is a copy of the source file;

in response to receiving the second command, (i) accessing an inode for the second destination file, (ii) generating a third set of physical block pointers that point to the first set of physical block pointers, and (iii) storing a set of inode pointers in the inode of the second destination file that point to the third set of physical block pointers.

* * * * *

UNITED STATES PATENT AND TRADEMARK OFFICE
CERTIFICATE OF CORRECTION

PATENT NO. : 9,916,112 B1
APPLICATION NO. : 14/041820
DATED : March 13, 2018
INVENTOR(S) : Alan L. Taylor, Karl M. Owen and Samuel Mullis It is certified that error appears in the above-identified patent and that said Letters Patent is hereby corrected as shown below:

Column 7, Line 61, Claim 8 change "the data" to --file data--

Column 7, Line 64, Claim 8 change "data stored" to --file data stored--

Signed and Sealed this
Eighth Day of May, 2018

Andrei Iancu
*Director of the United States Patent and Trademark Office*